US012322407B2

(12) United States Patent
Seo et al.

(10) Patent No.: US 12,322,407 B2
(45) Date of Patent: Jun. 3, 2025

(54) ARTIFICIAL INTELLIGENCE DEVICE CONFIGURED TO GENERATE A MASK VALUE

(71) Applicant: LG ELECTRONICS INC., Seoul (KR)

(72) Inventors: Jaepil Seo, Seoul (KR); Sungmoon Cho, Seoul (KR); Sangjun Oh, Seoul (KR); Hyeonsik Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 17/820,220

(22) Filed: Aug. 16, 2022

(65) Prior Publication Data

US 2023/0386491 A1 Nov. 30, 2023

(30) Foreign Application Priority Data

May 30, 2022 (WO) ................ PCT/KR2022/007632

(51) Int. Cl.
*G10L 21/0216* (2013.01)

(52) U.S. Cl.
CPC *G10L 21/0216* (2013.01); *G10L 2021/02166* (2013.01)

(58) Field of Classification Search
CPC .................. G10L 21/0216; G10L 2021/02166
See application file for complete search history.

(56) References Cited

U.S. PATENT DOCUMENTS

| | | | | |
|---|---|---|---|---|
| 2016/0094910 | A1 | 3/2016 | Vallabhan et al. | |
| 2017/0287499 | A1* | 10/2017 | Duong | G10L 21/0208 |
| 2020/0221146 | A1 | 7/2020 | Tsuji et al. | |
| 2020/0322722 | A1* | 10/2020 | Chen | H04R 3/005 |
| 2020/0357421 | A1 | 11/2020 | Fuchs et al. | |
| 2021/0327447 | A1 | 10/2021 | Maeng et al. | |
| 2023/0185518 | A1* | 6/2023 | Yang | H04N 5/77 386/223 |

FOREIGN PATENT DOCUMENTS

| | | |
|---|---|---|
| KR | 1020120101457 | 9/2012 |
| KR | 101322081 | 10/2013 |
| KR | 1020170053623 | 5/2017 |
| KR | 1020200116968 | 10/2020 |
| KR | 1020210128074 | 10/2021 |

OTHER PUBLICATIONS

Osamu Hoshuyama, Akihiko Sugiyama, "An Adaptive Microphone Array with Good Sound Quality Using Auxiliary Fixed Beamformers and Its DSP Implementation", 1999 IEEE, C&C Media Research Laboratories, NEC Corporation (Year: 1999).*
PCT International Application No. PCT/KR2022/007632, Search Report dated Feb. 16, 2023, 10 pages.

* cited by examiner

*Primary Examiner* — Pierre Louis Desir
*Assistant Examiner* — Daniel W Chung
(74) *Attorney, Agent, or Firm* — LEE, HONG, DEGERMAN, KANG & WAIMEY

(57) ABSTRACT

Voice output of a specific speaker is controlled using beamforming according to a video zooming magnification. By simultaneously performing adaptive beamforming and fixed beamforming, it is possible to reinforce voice output of the specific speaker.

9 Claims, 8 Drawing Sheets

ARTIFICIAL INTELLIGENCE DEVICE CONFIGURED TO GENERATE A MASK VALUE

CROSS-REFERENCE TO RELATED APPLICATION

Pursuant to 35 U.S.C. § 119, this application claims the benefit of an earlier filing date and right of priority to International Application No. PCT/KR2022/007632, filed on May 30, 2022, the contents of which are hereby incorporated by reference herein in its entirety.

BACKGROUND

1. Field

The present disclosure relates to an artificial intelligence device.

2. Description of the Related Art

Beamforming is a technique of concentrating a signal on a specific receiving device rather than distributing it in all directions. A direct connection achieved in this way is faster and more stable than a connection without beamforming.

Beamforming can improve the quality of the signal transmitted to the receiver without amplifying transmitted power by concentrating the signal in the specific direction. This is basically the ultimate ideal of wireless networking and the goal of most wireless communication enhancement technologies.

In addition, since beamforming does not distribute the signal in unnecessary directions, it is possible to reduce interference experienced by people trying to pick up another signal.

Recently, beamforming has been used to focus on the voice of a specific speaker during a video call.

As an existing prior patent document, there is Korean Patent No. 10-1322081, which amplifies or attenuates recorded audio according to a video zooming magnification to perform recording.

SUMMARY

An object of the present disclosure is to solve the above and other problems.

Another object of the present disclosure is to adjust beamforming according to video zooming.

Another object of the present disclosure is to control voice output of a specific speaker using beamforming according to a video zooming magnification.

An artificial intelligence device according to an embodiment of the present disclosure may comprise a plurality of microphones, and a processor configured to receive a video signal and a plurality of voice signals respectively input to the plurality of microphones, obtain an angle between a reference microphone and a specific speaker corresponding to a specific speaker image included in the video signal based on the video signal, obtain a first output value by performing adaptive beamforming based on the plurality of voice signals and the angle, obtain a second output value by performing fixed beamforming based on two voice signals input through two preset microphones among the plurality of voice signals and the angle, generate a mask value based on the first output value, the second output value and a video zooming magnification, and generate an enhancement signal based on the generated mask value and a phase of the second output value.

A method of operating an artificial intelligence device according to an embodiment of the present disclosure may comprise receiving a video signal and a plurality of voice signals respectively input to a plurality of microphones, obtaining an angle between a reference microphone and a specific speaker corresponding to a specific speaker image included in the video signal based on the video signal, obtaining a first output value by performing adaptive beamforming based on the plurality of voice signals and the angle, obtaining a second output value by performing fixed beamforming based on two voice signals input through two preset microphones among the plurality of voice signals and the angle, generating a mask value based on the first output value, the second output value and a video zooming magnification, and generating an enhancement signal based on the generated mask value and a phase of the second output value.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

According to an embodiment of the present disclosure, voice output of a specific speaker may be more concentrated according to a video zooming magnification. Therefore, a voice uttered by the specific speaker may be heard more clearly.

DETAILED DESCRIPTION

Figure 1:
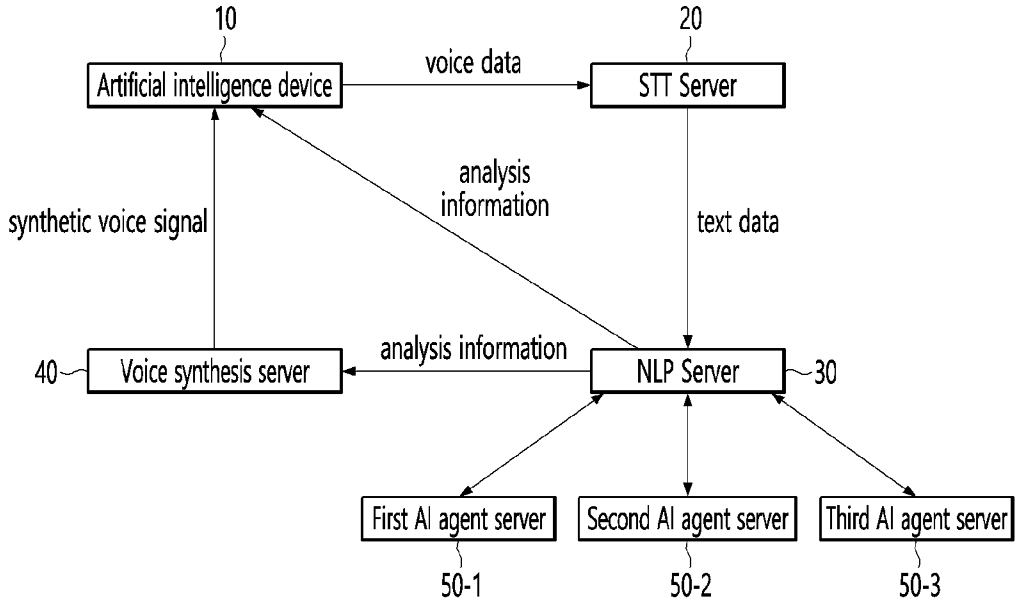
FIG. 1 is a diagram illustrating a voice system according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as “module” or “unit” may be used to refer to elements or components. Use of such a suffix herein is merely intended to facilitate description of the specification, and the suffix itself is not intended to have any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

While ordinal numbers including ‘first’, ‘second’, etc. may be used to describe various components, they are not intended to limit the components. These expressions may be used to distinguish one component from another component.

When it is said that a component is ‘coupled with/to’ or ‘connected to’ another component, it should be understood that the one component is connected to the other component directly or through any other component in between. On the other hand, when it is said that a component is ‘directly connected to’ or ‘directly coupled to’ another component, it should be understood that there is no other component between the components.

The artificial intelligence device described therein includes a mobile phone, a smartphone, a laptop computer, an artificial intelligence device for digital broadcasting, personal digital assistants (PDA), a portable multimedia player (PMP), a navigation system, and a slate PC, a tablet PC, a ultrabook, a wearable device (e.g., watch-type artificial intelligence device (smartwatch), glass-type artificial intelligence device (smart glass), HMD (head mounted) display)).

However, the artificial intelligence device 10 according to the embodiment described herein may also be applied to fixed artificial intelligence devices such as a smart TV, a desktop computer, a digital signage, a refrigerator, a washing machine, an air conditioner, a dishwasher, and the like.

In addition, the artificial intelligence device 10 according to an embodiment of the present disclosure is applicable to a fixed or movable robot.

In addition, the artificial intelligence device 10 according to an embodiment of the present disclosure may perform a function of a voice agent. The voice agent may be a program that recognizes a user’s voice and outputs a response suitable for the recognized user’s voice as a voice.

FIG. 1 is a diagram illustrating a voice system according to an embodiment of the present disclosure.

A general voice recognition and synthesis process may include converting voice data of a speaker into text data, analyzing the intention of the speaker based on the converted text data, converting text data corresponding to the analyzed intention into synthetic voice data, and outputting the converted synthetic voice data. For a voice recognition and synthesis process, the voice recognition system shown in FIG. 1 may be used.

Referring to FIG. 1, the voice recognition system 1 may include an artificial intelligence device 10, a speech-to-text (STT) server 20, a natural language processing (NLP) server 30 and a voice synthesis server 40 and a plurality of AI agent servers 50-1 to 50-3.

The artificial intelligence device 10 may transmit a voice signal corresponding to a speaker’s voice received through a microphone 122 to the STT server 210.

The STT server 20 may convert the voice data received from the artificial intelligence device 10 into text data.

The STT server 20 may increase accuracy of speech-text conversion using a language model.

The language model may refer to a model capable of calculating the probability of a sentence or calculating the probability that the next word will appear when previous words are given.

For example, the language model may include probabilistic language models such as a Unigram model, a Bigram model, an N-gram model, and the like.

The Unigram model is a model that assumes that the use of all words is completely independent of each other and is a model that calculates the probability of a sequence of words as the product of the probabilities of each word.

The Bigram model is a model that assumes that the use of words depends only on one previous word.

The N-gram model is a model that assumes that the use of words depends on previous (n−1) words.

That is, the STT server 20 may determine whether text data converted from voice data is properly converted using a language model, thereby increasing the accuracy of the conversion into the text data.

The NLP server 230 may receive text data from the STT server 20. The STT server 20 may be included in the NLP server 30.

The NLP server 30 may perform intention analysis on the text data based on the received text data.

The NLP server 30 may transmit intention analysis information indicating the result of performing intention analysis to the artificial intelligence device 10.

As another example, the NLP server 30 may transmit the intention analysis information to the voice synthesis server 40. The voice synthesis server 40 generate a synthetic voice based on the intention analysis information and transmit the generated synthetic voice to the artificial intelligence device 10.

The NLP server 30 may sequentially perform a morpheme analysis step, a syntax analysis step, a speech act analysis step and a conversation processing step, thereby generating the intention analysis information.

The morpheme analysis step is a step of classifying text data corresponding to a voice uttered by a user into morpheme units, which are the smallest units with meaning, and determining which part of speech each classified morpheme has.

The syntax analysis step is a step of classifying text data into noun phrases, verb phrases, adjective phrases, etc., using the result of the morpheme analysis step, and determining what kind of relationship exists between the classified phrases.

Through the syntax analysis step, the subject, object, and modifier of the voice uttered by the user may be determined.

The speech act analysis step is a step of analyzing the intention of the voice uttered by the user using the result of the syntax analysis step. Specifically, the speech act analysis step is a step of determining the intention of the sentence, such as whether the user asks a question, makes a request, or expresses a simple emotion.

The conversation processing step is a step of determining whether to answer the user’s utterance, to respond to the user’s utterance, or to ask a question for inquiring additional information, using the result of the speech act analysis step.

The NLP server 30 may generate intention analysis information including one or more of an answer to the intention uttered by the user, a response, and an inquiry for additional information, after the conversation processing step.

The NLP server 30 may transmit a search request to a search server (not shown) and receive search information corresponding to the search request, in order to search for information matching the user's utterance intention.

When the user's utterance intention is to search for content, the search information may include information on the searched content.

The NLP server 30 may transmit the search information to the artificial intelligence device 10, and the artificial intelligence device 10 may output the search information.

Meanwhile, the NLP server 30 may receive the text data from the artificial intelligence device 10. For example, when the artificial intelligence device 10 supports a speech-to-text function, the artificial intelligence device 10 may convert voice data into text data, and transmit the converted text data to the NLP server 30.

The voice synthesis server 40 may generate a synthetic voice by combining pre-stored voice data.

The voice synthesis server 40 may record the voice of a person selected as a model and divide the recorded voice into syllable or word units.

The voice synthesis server 40 may store the divided voice in syllable or word units in an internal or external database.

The voice synthesis server 40 may search a database for a syllable or word corresponding to the given text data, and synthesize a combination of the searched syllables or words to generate a synthetic voice. The voice synthesis server 40 may store a plurality of voice language groups corresponding to a plurality of languages.

For example, the voice synthesis server 40 may include a first voice language group recorded in Korean and a second voice language group recorded in English.

The voice synthesis server 40 may translate text data of a first language into text of a second language, and may generate a synthetic voice corresponding to the translated text of the second language by using the second voice language group.

The voice synthesis server 40 may transmit the generated synthetic voice to the artificial intelligence device 10.

The voice synthesis server 40 may receive analysis information from the NLP server 30. The analysis information may include information obtained by analyzing the intention of the voice uttered by the user.

The voice synthesis server 40 may generate a synthetic voice reflecting the user's intention based on the analysis information.

In an embodiment, the STT server 20, the NLP server 30 and the voice synthesis server 40 may be implemented as one server.

The functions of the STT server 20, the NLP server 30 and the voice synthesis server 40 described above may also be performed in the artificial intelligence device 10. To this end, the artificial intelligence device 10 may include one or more processors.

Each of the plurality of AI agent servers 50-1 to 50-3 may transmit search information to the NLP server 30 or the artificial intelligence device 10 according to the request of the NLP server 30.

When the intention analysis result of the NLP server 30 is a content search request, the NLP server 30 transmits a content search request to one or more of the plurality of AI agent servers 50-1 to 50-3, and receive the content search result from the corresponding server.

The NLP server 30 may transmit the received search result to the artificial intelligence device 10.

Figure 2:
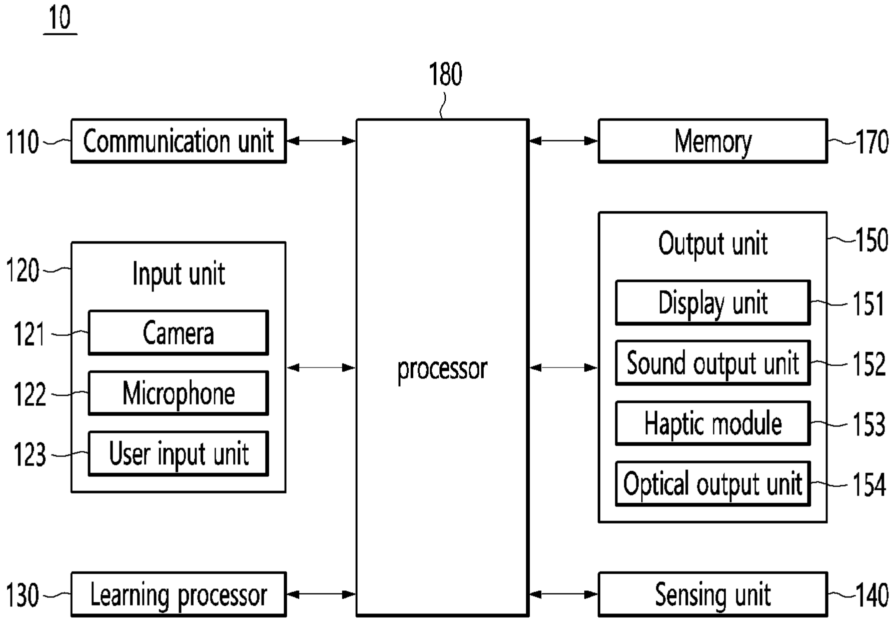
FIG. 2 is a block diagram illustrating a configuration of an artificial intelligence device according to an embodiment of the present disclosure.

FIG. 2 is a block diagram illustrating a configuration of an artificial intelligence device according to an embodiment of the present disclosure.

Referring to FIG. 2, the artificial intelligence device 10 may include a communication unit 110, an input unit 120, a learning processor 130, a sensing unit 140, an output unit 150, a memory 170 and a processor 180.

The communication unit 110 may transmit/receive data to/from external devices using wired/wireless communication technology. For example, the communication unit 110 may transmit/receive sensor information, user input, learning models, control signals, etc. to/from the external devices.

In this case, the communication technology used by the communication unit 110 may include GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), etc.

The input unit 120 may obtain various types of data.

The input unit 120 may include a camera for inputting a video signal, a microphone for receiving an audio signal, a user input unit for receiving information from a user, and the like. Here, by treating the camera or the microphone as a sensor, a signal obtained from the camera or the microphone may be referred to as sensing data or sensor information.

The input unit 120 may acquire learning data for model training and input data to be used when acquiring an output using the learning model. The input unit 120 may acquire raw input data, and, in this case, the processor 180 or the learning processor 130 may extract an input feature by preprocessing the input data.

The input unit 120 may include a camera 121 for inputting a video signal, a microphone 122 for receiving an audio signal and a user input unit 123 for receiving information from a user.

Audio data or image data collected by the input unit 120 may be analyzed and processed as a user's control command.

The input unit 120 is to input image information (or signal), audio information (or signal), data, or information input from a user. For input of image information, the artificial intelligence device 10 may include one or a plurality of cameras 121.

The camera 121 processes an image frame such as a still image or a moving image obtained by an image sensor in a video call mode or a shooting mode. The processed image frame may be displayed on the display unit 151 or stored in the memory 170.

The microphone 122 processes external sound signals into electrical voice data. The processed voice data can be utilized in various ways depending on the function (or running application program) being performed by the artificial intelligence device 10. On the other hand, various noise removal algorithms for removing noise generated in the process of receiving an external sound signal may be applied to the microphone 122.

The user input unit 123 receives information from a user. When information is input through the user input unit 123, the processor 180 may control the operation of the artificial intelligence device 10 to correspond to the input information.

The user input unit 123 may include a mechanical input unit (or a mechanical key, for example, a button located on the front/rear surface or side surface of the terminal 100, a dome switch, a jog wheel, a jog switch, etc.) and a touch input unit. As an example, the touch input unit consists of a virtual key, a soft key, or a visual key displayed on a touchscreen through software processing or a touch key disposed on a portion other than the touchscreen.

The learning processor 130 may train a model composed of an artificial neural network using learning data. Here, the learned artificial neural network may be referred to as a learning model. The learning model may be used to infer a result value with respect to new input data other than the learning data, and the inferred value may be used as a basis for a decision to perform a certain operation.

The learning processor 130 may include a memory integrated or implemented in the artificial intelligence device 10. Alternatively, the learning processor 130 may be implemented using the memory 170, an external memory directly coupled to the artificial intelligence device 10, or a memory maintained in an external device.

The sensing unit 140 may acquire at least one of internal information of the artificial intelligence device 10, surrounding environment information of the artificial intelligence device 10, and user information, using various sensors.

At this time, sensors included in the sensing unit 140 include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, and a lidar, radar, etc.

The output unit 150 may generate video, audio or tactile output.

The output unit 150 may include at least one of a display unit 151, a sound output unit 152, a haptic module 153 or an optical output unit 154.

The display unit 151 displays (outputs) information processed by the artificial intelligence device 10. For example, the display unit 151 may display information on an execution screen of an application program driven by the artificial intelligence device 10, or user interface (UI) and graphic user interface (GUI) information according to the information on the execution screen.

The display unit 151 may have an inter-layered structure or an integrated structure with a touch sensor in order to facilitate a touchscreen. The touchscreen may provide an output interface between the mobile terminal 100 and a user, as well as function as the user input unit 123 which provides an input interface between the mobile terminal 100 and the user.

The sound output unit 152 may output audio data received from the communication unit 110 or stored in the memory 170 in a call signal reception mode, a call mode, a record mode, a voice recognition mode, a broadcast reception mode, and the like.

The sound output unit 152 may also include at least one of a receiver, a speaker or a buzzer.

The haptic module 153 may generate various tactile effects that a user feels. A typical example of a tactile effect generated by the haptic module 153 may be vibration.

The optical output unit 154 outputs a signal for indicating event generation using light of a light source of the artificial intelligence device 10. Examples of events generated in the artificial intelligence device 10 may include message reception, call signal reception, a missed call, an alarm, a schedule notice, email reception, information reception through an application, and the like.

The memory 170 may store data to support various functions of the artificial intelligence device 10. For example, the memory 170 may store input data, learning data, a learning model, a learning history, etc. obtained by the input unit 120.

The processor 180 may determine at least one executable operation of the artificial intelligence device 10 based on information determined or generated using a data analysis algorithm or a machine learning algorithm. In addition, the processor 180 may control the components of the artificial intelligence device 10 to perform the determined operation.

The processor 180 may request, retrieve, receive, or utilize data of the learning processor 130 or the memory 170, and control the components of the artificial intelligence device 10 to perform predicted operation or desirable operation of the at least one executable operations.

When connection of an external device is required to perform the determined operation, the processor 180 may generate a control signal for controlling the corresponding external device and transmit the generated control signal to the corresponding external device.

The processor 180 may obtain intention information with respect to user input, and determine a user's requirement based on the obtained intention information.

The processor 180 may obtain intention information corresponding to the user input, using at least one of a speech to text (STT) engine for converting voice input into a character string or a natural language processing (NLP) engine for obtaining intention information of a natural language.

At least one of the STT engine or the NLP engine may be composed of an artificial neural network trained according to a machine learning algorithm. In addition, at least one of the STT engine or the NLP engine may be trained by a learning processor 130, trained by a learning processor 240 of an AI server 200, or trained by distributed processing thereof.

The processor 180 may collect history information including user feedback on the operation content or operation of the artificial intelligence device 10 and store it in the memory 170 or the learning processor 130 or transmit it to an external device such as the AI server 200. The collected historical information may be used to update the learning model.

The processor 180 may control at least some of the components of the artificial intelligence device 10 to drive an application program stored in the memory 170. Furthermore, the processor 180 may operate by combining two or more of the components included in the artificial intelligence device 10 to drive the application program.

Figure 3A:
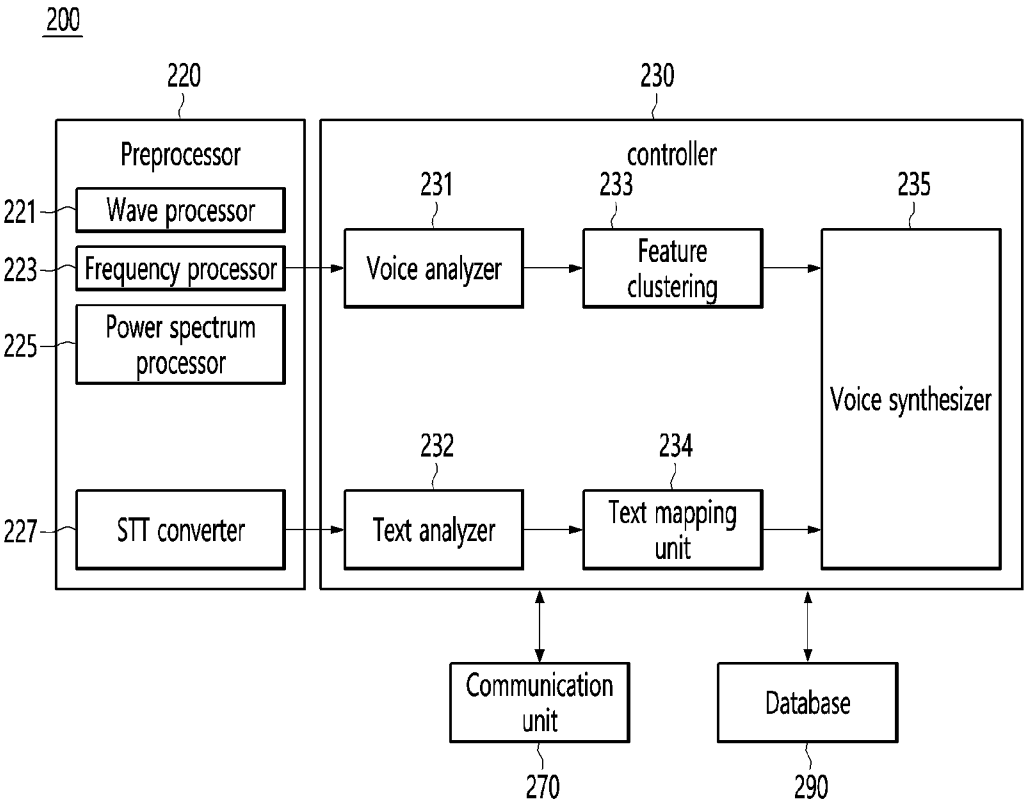
FIG. 3*a* is a block diagram illustrating a configuration of a voice service server according to an embodiment of the present disclosure.

FIG. 3*a* is a block diagram illustrating a configuration of a voice service server according to an embodiment of the present disclosure.

The voice service server 200 may include one or more of the STT server 20, the NLP server 30 and the voice synthesis server 40 shown in FIG. 1. The voice service server 200 may be named a server system.

Referring to FIG. 3*a*, the voice service server 200 may include a preprocessor 220, a controller 230, a communication unit 270 and a database 290.

The preprocessor 220 may preprocess the voice received through the communication unit 270 or the voice stored in the database 290.

The preprocessor 220 may be implemented as a chip separate from the controller 230 or may be implemented as a chip included in the controller 230.

The preprocessor 220 may receive a voice signal (uttered by the user) and filter out a noise signal from the voice signal before converting the received voice signal into text data.

When the preprocessor 220 is provided in the artificial intelligence device 10, it is possible to recognize a start word for activating voice recognition of the artificial intelligence device 10. The preprocessor 220 may convert the start word received through the microphone 121 into text data, and determine that the start word has been recognized when the converted text data is text data corresponding to a pre-stored start word.

The preprocessor 220 can convert the voice signal, from which noise is removed, into a power spectrum.

The power spectrum may be a parameter indicating which frequency component is included in the waveform of the temporally varying voice signal with what size.

The power spectrum shows the distribution of the squared value of the amplitude according to the frequency of the waveform of the voice signal. This will be described with reference to FIG. 3*b*.

Figure 3B:
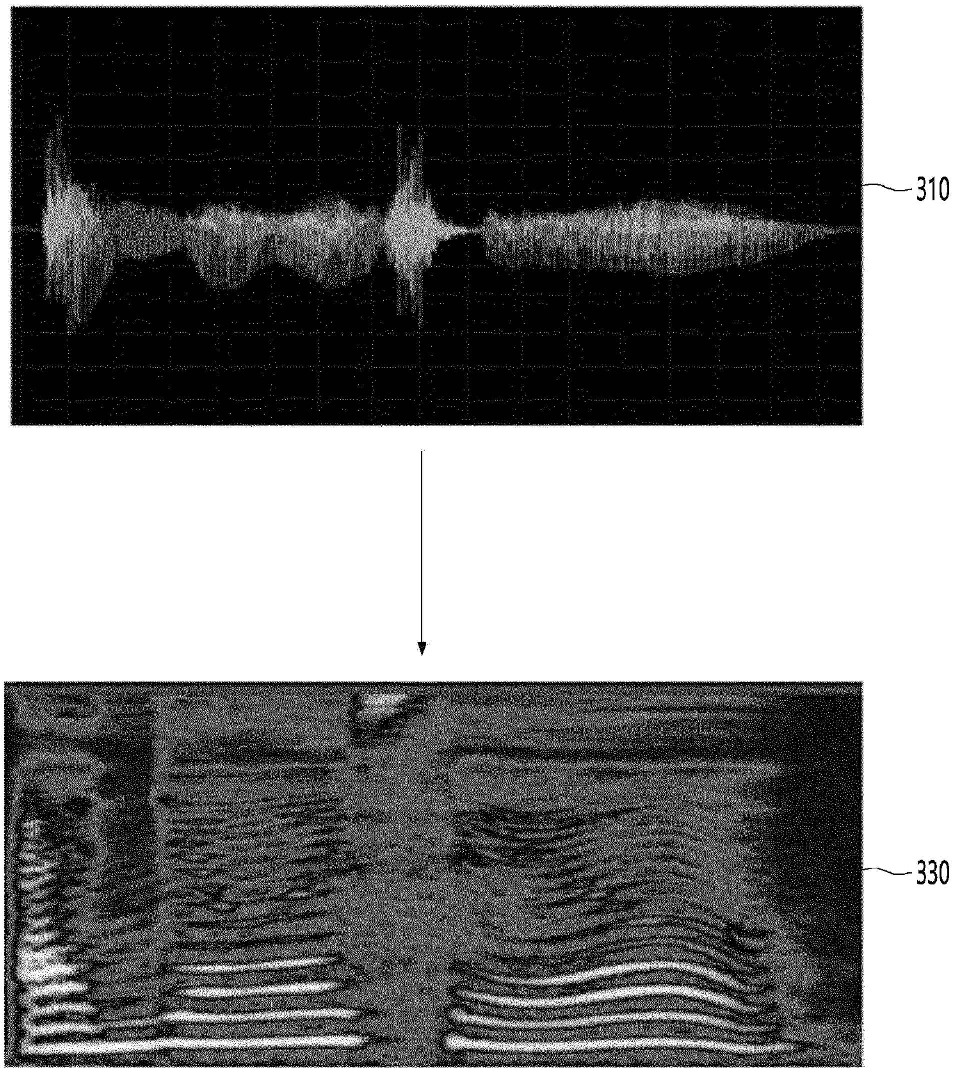
FIG. 3*b* is a view illustrating an example of converting a voice signal into a power spectrum according to an embodiment of the present disclosure.

FIG. 3*b* is a view illustrating an example of converting a voice signal into a power spectrum according to an embodiment of the present disclosure.

Referring to FIG. 3*b*, a voice signal 310 is shown. The voice signal 210 may be received from an external device or may be a signal previously stored in the memory 170.

The x-axis of the voice signal 310 may represent time, and the y-axis thereof may represent the magnitude of the amplitude.

The power spectrum processor 225 may convert the audio signal 310 having an x-axis as a time axis into a power spectrum 330 having an x-axis as a frequency axis.

The power spectrum processor 225 may convert the voice signal 310 into the power spectrum 330 using Fast Fourier Transform (FFT).

The x-axis of the power spectrum 330 represents the frequency, and the y-axis thereof represents the squared value of the amplitude.

FIG. 3*a* will be described again.

The functions of the preprocessor 220 and the controller 230 described in FIG. 3*a* may be performed even in the NLP server 30.

The preprocessor 220 may include a wave processor 221, a frequency processor 223, the power spectrum processor 225, and a speech to text (STT) converter 227.

The wave processor 221 may extract the waveform of the voice.

The frequency processor 223 may extract a frequency band of the voice.

The power spectrum processor 225 may extract the power spectrum of the voice.

The power spectrum may be a parameter indicating which frequency component is included in the waveform of the temporally varying voice signal with what size.

The speech-to-text (STT) converter 227 may convert speech into text.

The speech-to-text (STT) converter 227 may convert the speech of a specific language into text of the corresponding language.

The controller 230 may control overall operation of the voice service server 200.

The controller 230 may include a voice analyzer 231, a text analyzer 232, a feature clustering unit 233, a text mapping unit 234 and a voice synthesizer 235.

The voice analyzer 231 may extract characteristic information of the voice using one or more of the waveform of the voice, the frequency band of the voice, and the power spectrum of the voice, which are preprocessed by the preprocessor 220.

The characteristic information of the voice may include one or more of speaker's gender information, speaker's voice (or tone), a pitch, a speaker's speaking way, a speaker's utterance speed, and a speaker's emotion.

In addition, the characteristic information of the voice may further include the tone of the speaker.

The text analyzer 232 may extract main expression phrases from text converted by the speech-to-text converter 227.

When a change in tone between a phrase and a phrase from the converted text is detected, the text analyzer 232 may extract a phrase with a changed tone as a main expression phrase.

The text analyzer 232 may determine that the tone has been changed, when the frequency band between the phrase and the phrase is changed by more than a preset band.

The text analyzer 232 may extract key words from phrases of the converted text. The main word may be a noun present in a phrase, but this is only an example.

The feature clustering unit 233 may classify the speaker's utterance type using the characteristic information of the voice extracted by the voice analyzer 231.

The feature clustering unit 233 may classify the speaker's utterance type by giving weight to each of the type items constituting the characteristic information of the voice.

The feature clustering unit 233 may classify the speaker's utterance type using an attention technique of the deep learning model.

The text mapping unit 234 may translate text converted into a first language into text of a second language.

The text mapping unit 234 may map the text translated into the second language with the text of the first language.

The text mapping unit 234 may map the main expression phrases constituting the text of the first language to the phrases of the second language corresponding thereto.

The text mapping unit 234 may map the utterance type corresponding to the main expression phrase constituting the text of the first language to the phrase of the second language. This is to apply the classified utterance type to the phrase of the second language.

The voice synthesizer 235 may generate a synthetic voice, by applying the utterance type and the speaker's tone classified by the feature clustering unit 233 to the main expression phrase of the text translated into the second language by the text mapping unit 234.

The controller 230 may determine the user's utterance feature using one or more of the transmitted text data or power spectrum 330.

The user's utterance feature may include a user's gender, a user's pitch, a user's tone, a user's utterance topic, a user's utterance speed, and a user's volume.

The controller 230 may obtain a frequency of the voice signal 310 and an amplitude corresponding to the frequency, using the power spectrum 330.

The controller 230 may determine the gender of the user who uttered the voice, using the frequency band of the power spectrum 230.

For example, when the frequency band of the power spectrum 330 is within a preset first frequency band range, the controller 230 may determine the gender of the user as a male.

When the frequency band of the power spectrum 330 is within a preset second frequency band range, the controller 230 may determine the user's gender as a female. Here, the second frequency band range may be larger than the first frequency band range.

The controller 230 may determine the pitch of the voice using the frequency band of the power spectrum 330.

For example, the controller 230 may determine the degree of pitch of the sound according to the magnitude of the amplitude within a specific frequency band range.

The controller 230 may determine the user's tone by using the frequency band of the power spectrum 330. For example, the controller 230 may determine, among the frequency bands of the power spectrum 330, a frequency band having an amplitude magnitude greater than or equal to a certain magnitude as a user's main sound range, and may determine the determined main sound range as the user's tone.

The controller 230 may determine the user's utterance speed from the converted text data, through the number of syllables uttered per unit time.

The controller 230 may determine the user's utterance topic using the Bag-Of-Word Model technique, for the converted text data.

The Bag-Of-Word Model technique is a technique for extracting mainly used words based on the frequency of words in a sentence. Specifically, the Bag-Of-Word Model technique is a technique for extracting a unique word from a sentence, expressing the frequency of each extracted word as a vector, and determining the utterance topic as the feature.

For example, when words such as <running> and <stamina> frequently appear in the text data, the controller 230 may classify the user's utterance topic as exercise.

The controller 230 may determine the user's utterance topic from the text data using a known text categorization technique. The controller 230 may extract a keyword from the text data and determine the user's utterance topic.

The controller 230 may determine the user's voice volume in consideration of the amplitude information in the entire frequency band.

For example, the controller may determine the user's voice volume based on an average or a weighted average of amplitudes in each frequency band of the power spectrum.

The communication unit 270 may perform communication with an external server by wire or wirelessly.

The database 290 may store the voice of the first language included in the content.

The database 290 may store a synthetic voice in which the voice of the first language is converted into the voice of the second language.

The database 290 may store the first text corresponding to the voice of the first language and the second text in which the first text is translated into the second language.

The database 290 may store various learning models required for speech recognition.

Meanwhile, the processor 180 of the artificial intelligence device 10 shown in FIG. 2 may include the preprocessor 220 and the controller 230 shown in FIG. 3.

That is, the processor 180 of the artificial intelligence device 10 may perform the functions of the preprocessor 220 and the function of the controller 230.

Figure 4:
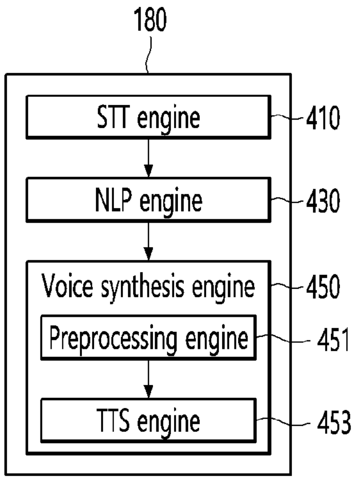
FIG. 4 is a block diagram illustrating a configuration of a processor for voice recognition and synthesis of an artificial intelligence device according to an embodiment of the present disclosure.

FIG. 4 is a block diagram illustrating a configuration of a processor for voice recognition and synthesis of an artificial intelligence device according to an embodiment of the present disclosure.

That is, the voice recognition and synthesis process of FIG. 4 may be performed by the learning processor 130 or the processor 180 of the artificial intelligence device 10 without using a server.

Referring to FIG. 4, the processor 180 of the artificial intelligence device 10 may include an STT engine 410, an NLP engine 430, and a voice synthesis engine 450.

Each engine may be one of hardware or software.

The STT engine 410 may perform the function of the STT server 20 of FIG. 1. That is, the STT engine 410 may convert voice data into text data.

The NLP engine 430 may perform the function of the NLP server 30 of FIG. 2*a*. That is, the NLP engine 430 may obtain intention analysis information indicating the intention of the speaker from the converted text data.

The voice synthesis engine 450 may perform the function of the voice synthesis server 40 of FIG. 1.

The voice synthesis engine 450 may search a database for a syllable or word corresponding to the given text data, and synthesize a combination of the searched syllables or words, thereby generating a synthetic speech.

The voice synthesis engine 450 may include a preprocessing engine 451 and a TTS engine 453.

The pre-processing engine 451 may pre-process text data before generating the synthetic voice.

Specifically, the pre-processing engine 451 performs tokenization for dividing the text data into tokens which are significant units.

After tokenization, the pre-processing engine 451 may perform cleansing operation of removing unnecessary characters and symbols, in order to remove noise.

Thereafter, the pre-processing engine 451 may generate the same word token by integrating word tokens having different expression methods.

Thereafter, the pre-processing engine 451 may remove insignificant word tokens (stopwords).

The TTS engine 453 may synthesize a voice corresponding to the pre-processed text data and generate a synthetic voice.

Figure 5:
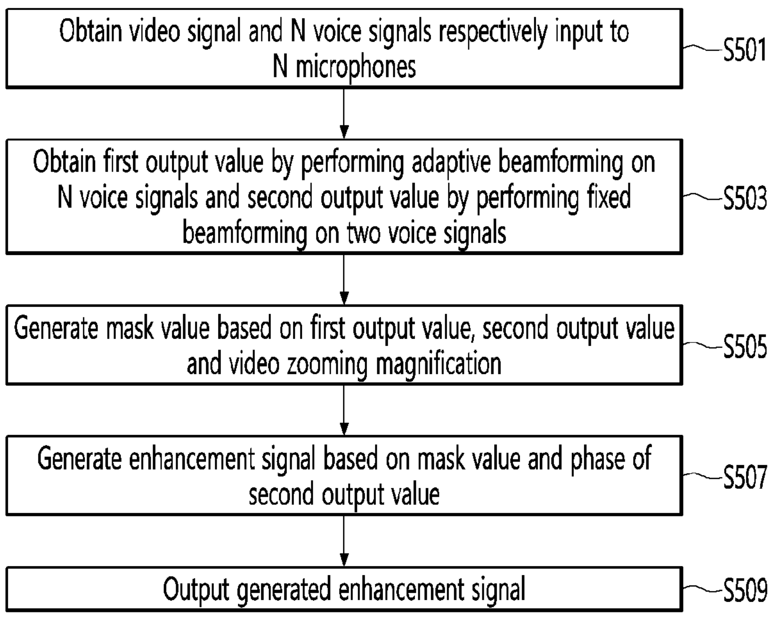
FIG. 5 is a flowchart illustrating a beamforming control method of an artificial intelligence device according to an embodiment of the present disclosure.

FIG. 5 is a flowchart illustrating a beamforming control method of an artificial intelligence device according to an embodiment of the present disclosure.

Referring to FIG. 5, the processor 180 of the artificial intelligence device 10 obtains a video signal and N voice signals input to N microphones (S501).

Each of the N microphones may be provided in the artificial intelligence device 10 or may be provided separately from the artificial intelligence device 10.

N may be a natural number of 4 or more, but this is merely an example.

When N is 4, four microphones may be arranged at an interval of 4 cm to have a total length of 12 cm.

The four microphones may be elements configured separately from or may be included in the artificial intelligence device 10.

Each voice signal may include signals for voices uttered by a plurality of speakers.

The processor 180 obtains a first output value by performing adaptive beamforming on N voice signals, and obtains a second output value by performing fixed beamforming on two voice signals among N voice signals (S503).

The processor 180 may convert each voice signal into a frequency-based power spectrum. The processor 180 may perform adaptive beamforming on the converted power spectrum.

The processor 180 may perform adaptive beamforming based on an angle and power spectrum received from the video processor 610.

The adaptive beamforming may be a beamforming method of performing learning to increase power corresponding to the angle in the power spectrum using the angle received from the video processor 610. The corresponding angle may be an angle formed between a reference microphone and a point where a specific speaker is located.

The processor 180 may obtain a first output value by performing adaptive beamforming on the N voice signals.

The processor 180 may receive an angle formed between each of the two microphones at a preset position and a specific speaker from the video processor 610.

The processor 180 may perform fixed beamforming based on the received angle and two voice signals.

The fixed beamforming may be a beamforming method of removing noise from a voice signal input to each of two microphones at the preset position.

The fixed beamforming may be a beamforming method of using the angle formed between each of two microphones at the preset position and the specific speaker to increase the power of a point corresponding to the corresponding angle in the power spectrum.

The processor 180 generates a mask value based on the first output value, the second output value, and a zooming magnification of the video signal (S505).

The processor 180 may generate a mask value using a first output value that is a result of the adaptive beamforming, a second output value that is a result of the fixed beamforming, and the zooming magnification received from the video processor 610.

This will be described later.

The processor 180 generates an enhancement signal based on the mask value and the phase of the second output value (S507).

The processor 180 may generate an enhancement signal for enhancing the output of a voice uttered by the specific speaker based on the mask value and the phase of the second output value.

The processor 180 outputs the generated enhancement signal (S509).

In an embodiment, the processor 180 may output the enhancement signal through the sound output unit 152.

In another embodiment, the processor 180 may transmit the enhancement signal to a counterpart device connected to the artificial intelligence device 10 through the communication unit 110.

Figure 6:
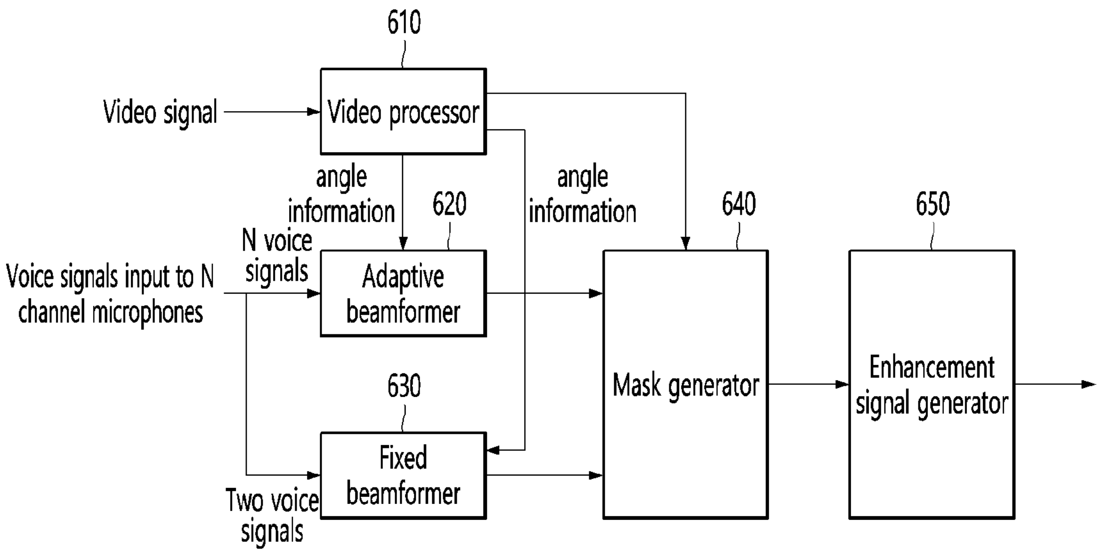
FIG. 6 is a diagram illustrating a beamforming control process according to an embodiment of the present disclosure as a hardware block diagram.

FIG. 6 is a diagram illustrating a beamforming control process according to an embodiment of the present disclosure as a hardware block diagram.

The components of FIG. 6 may be components included in the processor 180 of FIG. 2, but this is only an example, and may be a configuration separate from the processor 180.

Referring to FIG. 6, the processor 180 may include a video processor 610, an adaptive beamformer 620, a fixed beamformer 630, a mask generator 640 and an enhancement signal generator 650.

The video processor 610 may receive the video signal captured through the camera 121 from the camera 121.

The video processor 610 may calculate an angle between a speaker image included in the video signal and a reference microphone among the plurality of microphones based on the video signal. The reference microphone may be located at the shortest distance from the artificial intelligence device 10 among the plurality of microphones.

The video processor 610 may obtain an angle between a first point corresponding to a specific speaker image included in the video signal and a second point at which the reference microphone is located.

When the video signal includes a plurality of speaker images, the video processor 610 may obtain an angle formed between each of the plurality of speaker images and the reference microphone.

The video processor 610 may transmit angle information including an angle corresponding to a specific speaker image included in the video signal to the adaptive beamformer 620 and the fixed beamformer 630. The specific speaker image may be a main speaker image enlarged on the screen according to video zooming.

In an embodiment, the preprocessor (not shown) may convert the voice signal into a power spectrum and transmit the converted power spectrum to the adaptive beamformer 620 and the fixed beamformer 630.

The adaptive beamformer 620 may perform adaptive beamforming on a plurality of voice signals respectively input to a plurality of microphones.

The adaptive beamformer 620 may convert each time-based voice signal into a frequency-based power spectrum.

The adaptive beamforming may be a beamforming method learned to remove noise other than a voice uttered by a specific speaker from a power spectrum.

Specifically, the adaptive beamforming may be a beamforming method learned to increase power of a point corresponding to the angle in the power spectrum using the angle received from the video processor 610. The corresponding angle may be an angle formed between the reference microphone and a point where the specific speaker is located.

The adaptive beamformer 620 may include an adaptive filter for removing noise other than the voice uttered by the specific speaker from the power spectrum.

The performance of the adaptive beamformer 620 may be expressed as a signal to noise ratio (SNR).

The adaptive beamformer 620 may remove a noise component from power spectra corresponding to a plurality of voice signals, and may output a first output value according to a result of the removal.

The first output value may be expressed as power according to time.

The fixed beamformer 630 may perform fixed beamforming on voice signals respectively input to the two microphones.

The fixed beamformer 630 may use a beamforming method of removing noise from a voice signal respectively input to the two microphones at preset positions.

The two microphones may be outermost microphones among the plurality of microphones.

The fixed beamformer 630 may include a filter for removing noise from the power spectrum.

The output of the fixed beamformer 630 may also be expressed as power. The output of the fixed beamformer 630 may represent the result of a weakest focusing strength.

The fixed beamformer 630 may remove a noise component from power spectra corresponding to the two voice signals, and may output a second output value according to a result of removal.

The mask generator 640 may generate a mask value using the first output value, the second output value, and the zooming magnification received from the video processor 610.

The mask generator 640 may calculate a mask value through Equation 1 below.

$$G(k,l) = MIN\left(\beta\frac{|E_{Adaptive}(k,l)|}{|E_{Fixed}(k,l)|},\ 1\right) \qquad \text{Equation 1}$$

E_Adaptive(k,l) may be output of an l-th adaptive beamformer with a k-th frequency.

|E_Adaptive(k,l)| may be a square root value of gain of the output of the l-th adaptive beamformer with the k-th frequency.

E_fixed(k,l) may be output of an l-th fixed beamformer with a k-th frequency.

|E_Fixed (k,l)| may be a square root value of gain of the output of the l-th fixed beamformer with the k-th frequency.

β may be determined according to a video zooming magnification α.

For example, when the video zooming magnification is divided into five steps of 1×, 2×, 3×, 5× and 10×, β may be 0 at a minimum magnification, and may be β=|E_fixed(k,l)| at a maximum magnification 10×.

In the remaining magnifications (2×, 3×, 5×), β may be determined as the maximum magnification/α.

The video zooming magnification may be obtained by the video processor 610. The video processor 610 may receive user input for adjusting a zooming magnification, and obtain a video zooming magnification corresponding to the received input.

The enhancement signal generator 650 may generate a enhanced voice signal using the mask value generated by the mask generator 640. The enhanced voice signal may be a signal in which the focusing strength of the voice uttered by the speaker who is the subject of video zooming is increased.

The enhancement signal generator 650 may generate the enhancement signal using Equation 2 below.

$$E\_OUT(k,l)=G(k,l)\varphi(E\_Fixed(k,l)) \quad \text{[Equation 2]}$$

Φ may be a phase and may be a phase of E_fixed(k,l) which is output of the fixed beamformer.

The enhancement signal generator 650 may use the mask value as gain and the phase of the output of the fixed beamformer 630 as the phase, in order to generate a final voice signal.

The enhancement signal generator 650 may transmit the generated enhancement signal to the sound output unit 152.

The sound output unit 152 may output the enhancement signal received from the enhancement signal generator 650.

According to an embodiment of the present disclosure, a voice uttered by a specific speaker may be intensively output according to a video zooming magnification. Accordingly, the quality of voice output uttered by the specific speaker may be greatly improved.

Figure 7A:
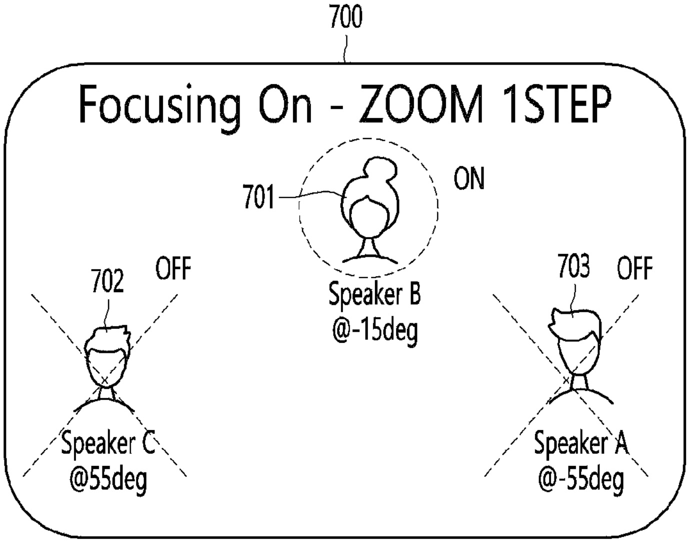
FIGS. 7*a* to 7*c* are diagrams illustrating examples in which a voice uttered by a specific speaker is intensively output according to a video zooming magnification.
Figure 7A:
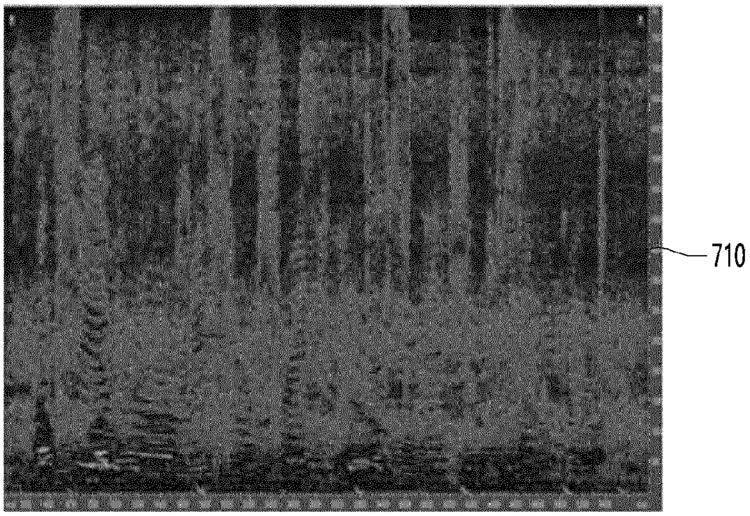
Figure 7B:
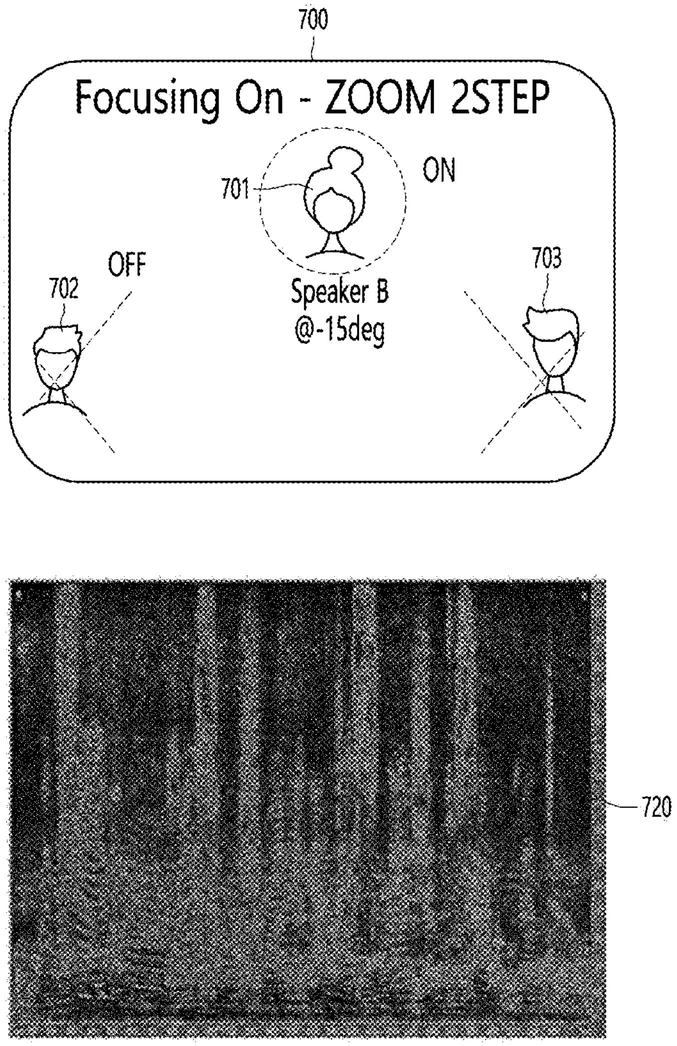
Figure 7C:
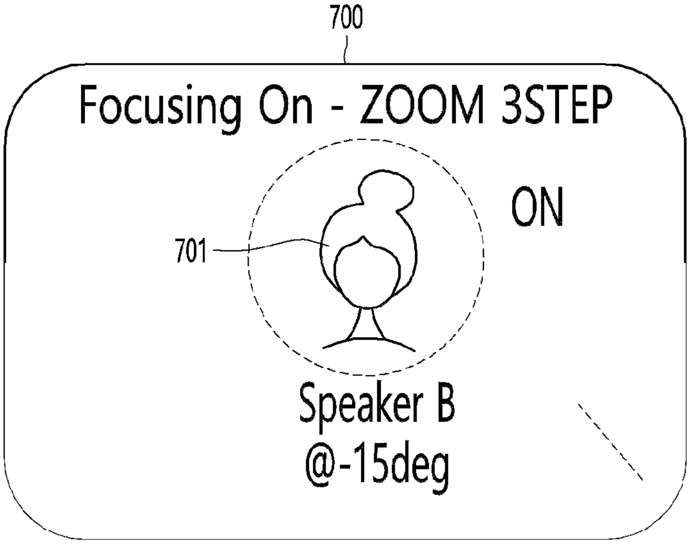
Figure 7C:
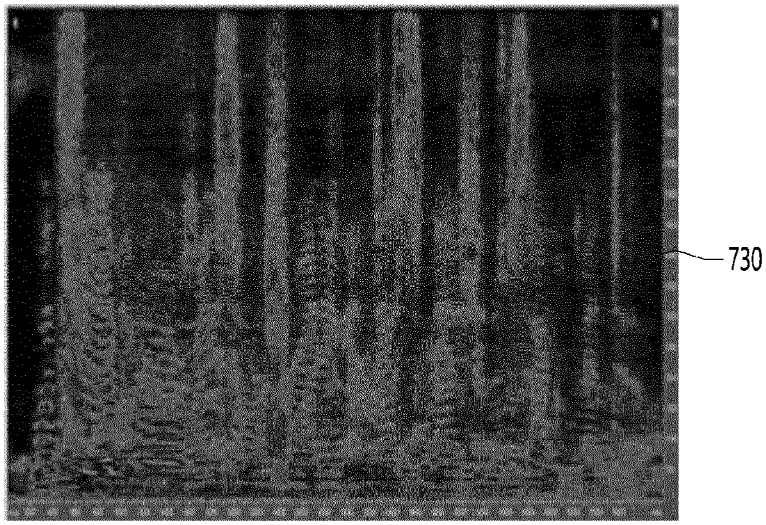

FIGS. 7*a* to 7*c* are diagrams illustrating examples in which a voice uttered by a specific speaker is intensively output according to a video zooming magnification.

In FIGS. 7*a* to 7*c*, three speaker images 701, 702 and 703 corresponding to three speakers are shown. That is, in FIGS. 7*a* to 7*c*, a scenario in which three speakers make a video call is assumed.

It is assumed that the point where the first speaker is located forms an angle of −15 degrees with the point where the reference microphone is located, the point where the second speaker is located forms an angle of 55 degrees with the point where the reference microphone is located, and the point where the third speaker is located forms an angle of −55 degrees with the point where the reference microphone is located.

The display unit 151 of the artificial intelligence device 10 may display a video conference image 700 including speaker images 701, 702, and 703.

The zooming magnification of 1× is shown in FIG. 7*a*, the zooming magnification of 3× is shown in FIG. 7*b*, and the zooming magnification of 5× is shown in FIG. 7*c*.

In addition, the artificial intelligence device 10 may obtain power spectra 710, 720 and 730 of the voice signals corresponding to the zooming magnifications.

Referring to FIG. 7*b*, it can be seen that, in the second power spectrum when the zooming magnification is 3×, more noise may be removed compared to the first power spectrum 710 shown in FIG. 7*a* when the zooming magnification is 1×.

When the zooming magnification is changed from 3× to 5×, the third power spectrum 730 may be obtained. It can be seen that noise may be removed from the third power spectrum 730 compared to the second power spectrum 720.

According to an embodiment of the present disclosure, as the video zooming magnification increases, noise may be removed from a voice uttered by a specific speaker, so that the voice uttered by the specific speaker may be intensively output.

The present disclosure described above can be implemented as computer-readable code on a medium in which a program is recorded. The computer-readable medium includes all kinds of recording devices in which data readable by a computer system is stored. Examples of computer-readable media include a Hard Disk Drive (HDD), a Solid State Disk (SSD), a Silicon Disk Drive (SDD), a ROM, a RAM, a CD-ROM, a magnetic tape, a floppy disk, an optical data storage device, etc. In addition, the computer may include the processor 180 of the artificial intelligence device.

What is claimed is:

1. An artificial intelligence device comprising:

a plurality of microphones; and a processor configured to:

receive a video signal and a plurality of voice signals each respectively input from a corresponding microphone among the plurality of microphones;

obtain, based on the received video signal, an angle between a reference microphone and a specific speaker corresponding to a specific speaker image from the received video signal;

determine a first output value by performing adaptive beamforming based on the received plurality of voice signals and the obtained angle;

determine a second output value by performing fixed beamforming based on two voice signals input through two preset microphones among the received plurality of voice signals and the obtained angle;

generate a mask value based on the determined first output value, the determined second output value, and a video zooming magnification;

generate an enhancement signal based on the generated mask value and a phase of the second output value;

convert each of the two voice signals into a power spectrum;

obtain the second output value by performing the fixed beamforming to increase power of a point corresponding to the obtained angle from the converted power spectrum; and generate the mask value according to Equation 1 below:

$$G(k,l) = MIN\left(\beta\frac{|E_{Adaptive}(k,l)|}{|E_{Fixed}(k,l)|}, 1\right) \quad \text{Equation 1}$$

wherein E_Adaptive(k,l) denotes the first output value according to a k-th frequency and an l-th adaptive beamformer,

|E_Adaptive(k,l)| denotes a square root value of gain of the first output value, E_fixed(k,l) denotes the second output value according to a k-th frequency and an l-th fixed beamformer,

|E_Fixed (k,l)| denotes a square root value of gain of the second output value,

β is set to 0 in case of a minimum magnification, β=|E_Fixed (k,l)| in case of a maximum magnification, and MAX (α)/α in the other case, and α denotes the video zooming magnification.

2. The artificial intelligence device of claim 1, wherein the processor is further configured to:

convert each of the received plurality of voice signals into a second power spectrum, wherein the first output value is determined by performing the adaptive beamforming to increase power of a second point corresponding to the obtained angle from the second converted power spectrum.

3. The artificial intelligence device of claim 1, wherein the processor is further configured to:

generate the enhancement signal according to Equation 2 below:

$$E\_OUT(k,l)=G(k,l)\varphi(E\_Fixed(k,l)) \quad \text{Equation 2}$$

wherein, Φ denotes a phase of E_fixed(k,l).

4. The artificial intelligence device of claim 1, wherein the processor is further configured to obtain the video zooming magnification through a user input.

5. The artificial intelligence device of claim 1, wherein the processor comprises:

a video processor configured to obtain the angle from the received video signal, an adaptive beamformer configured to output the first output value by performing adaptive beamforming based on the received plurality of voice signals and the obtained angle, a fixed beamformer configured to output the second output value by performing fixed beamforming based on the two voice signals and the obtained angle, a mask generator configured to generate the mask value based on the obtained first output value, the obtained second output value, and the video zooming magnification, and an enhancement signal generator configured to generate the enhancement signal based on the generated mask value and a phase of the obtained second output value.

6. A method of operating an artificial intelligence device, the method comprising:

receiving a video signal and a plurality of voice signals each respectively input from a corresponding microphone among a plurality of microphones;

obtaining, based on the received video signal, an angle between a reference microphone and a specific speaker corresponding to a specific speaker image from the received video signal;

determining a first output value by performing adaptive beamforming based on the received plurality of voice signals and the obtained angle;

determining a second output value by performing fixed beamforming based on two voice signals input through two preset microphones among the received plurality of voice signals and the obtained angle;

generating a mask value based on the determined first output value, the determined second output value and a video zooming magnification; and generating an enhancement signal based on the generated mask value and a phase of the second output value, wherein the second output value is determined by converting each of the two voice signals into a power spectrum and by performing the fixed beamforming to increase power of a point corresponding to the angle from the converted power spectrum, and wherein the mask value is obtained according to Equation 1 below:

$$G(k, l) = MIN\left(\beta\frac{|E_{Adaptive}(k, l)|}{|E_{FIxed}(k, l)|}, 1\right) \quad \text{Equation 1}$$

wherein E_Adaptive(k,l) denotes the first output value according to a k-th frequency and an l-th adaptive beamformer,

|E_Adaptive(k,l)| denotes a square root value of gain of the first output value, E_fixed(k,l) denotes the second output value according to a k-th frequency and an l-th fixed beamformer,

|E_Fixed (k,l)| denotes a square root value of gain of the second output value,

β is set to 0 in case of a minimum magnification, β=|E_Fixed (k,l)| in case of a maximum magnification, and MAX(α)/α in the other case, and α denotes the video zooming magnification.

7. The method of claim 6, wherein the first output value is determined by converting each of the received plurality of voice signals into a second power spectrum and by performing the adaptive beamforming to increase power of a second point corresponding to the angle from the second converted power spectrum.

8. The method of claim 6, wherein the enhancement signal is generated according to Equation 2 below:

$$E\_OUT(k,l)=G(k,l)\varphi(E\_Fixed(k,l)) \quad \text{Equation 2}$$

wherein Φ denotes a phase of E_fixed(k,l).

9. The method of claim 6, further comprising obtaining the video zooming magnification through user input.

* * * * *